Sept. 15, 1953  S. D. J. DUNLAP  2,652,269
MEANS FOR SECURING CONDUCTORS TO OUTLET BOXES
Filed June 7, 1950

INVENTOR.
SAMUEL D. J. DUNLAP.
BY
Robert A. Sloman
ATTORNEY

Patented Sept. 15, 1953

2,652,269

UNITED STATES PATENT OFFICE 2,652,269

MEANS FOR SECURING CONDUCTORS TO OUTLET BOXES

Samuel D. J. Dunlap, Detroit, Mich.

Application June 7, 1950, Serial No. 166,670

1 Claim. (Cl. 287—20)

This invention relates to conduit clamps, and more particularly to a clamp for securing electrical conduits to apertured electric outlet boxes or similar structures.

It is the object of the present invention to provide an improved clamping device which may be manufactured in quantities preferably as stampings, or which may be constructed of a plastic substance.

It is the further object of this invention to provide a clamping device of simplified construction with a minimum number of parts which may be readily assembled upon the electrical conduit adjacent an aperture in the outlet box for the purpose of securing the cable in rigid relation to the wall of said box.

These and other objects will be seen from the following specification and claim in conjunction with appended drawing in which:

Figure 1:
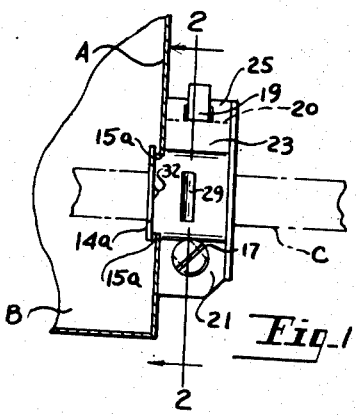
Figure 1 is a side elevation of the assembled clamp and electrical conduit, illustrating the same in secured position to the apertured side wall of an electric terminal box, switch box or outlet box which is fragmentarily shown and sectioned.

It will be understood that the above drawing illustrates merely a preferred embodiment of the invention, and that other embodiments are contemplated within the scope of the claim hereafter set out.

Referring to the drawing, the interconnecting cooperating clamp members comprise two complementary rigid plate members 10 and 12 formed of metal or plastic, and which are preferably sheet metal stampings.

Each plate member includes an intermediate outwardly curved concave conduit holding portions 13 and 13a respectively terminating at one end in the right angular outwardly extending integral flanges 14 and 14a which are arranged in alignment and extend in opposite directions when said plate members are assembled upon the cable or conduit C.

Figures 2, 15:
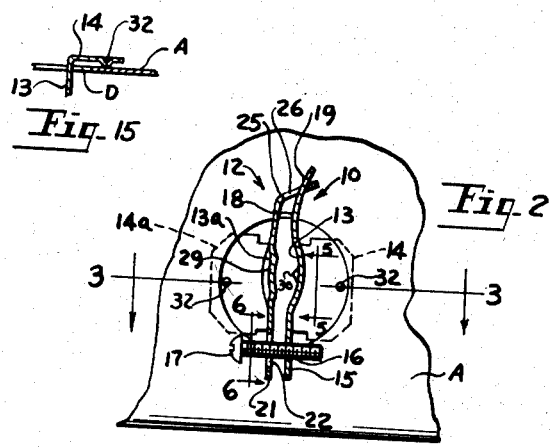
Figure 2 is a section on line 2—2 of Figure 1.
Figure 15 is a section on line 15—15 of Figure 4.

Plate member 10 at the side of its outwardly curved intermediate portion 13, is provided with a projecting ear 15 of reduced width and set off upon one side from said intermediate portion by the shoulder 15a, such as is shown in Fig. 1. A threaded opening 16 is provided through the ear 15 adapted for reception of the screw or bolt 17 as shown in Fig. 2.

The opposite portion of clamp element 10 includes a substantially flat straight rigid wall portion 18, which is also inwardly set off upon one side from the intermediate curved portion 13 by the shoulder 15a, such as shown in Fig. 1.

Wall portion 18 terminates in the inwardly offset aligned projecting tongue 19, which is curved outwardly and which is of reduced width so as to leave oppositely disposed flat shoulders 20 at the juncture of wall 18 and said tongue as indicated in dotted lines in Fig. 1.

The other clamp element i. e. plate member 12 also includes a central concave outwardly curved intermediate portion 13a, and there is provided upon one side of said intermediate portion an ear 21 of the same shape as ear 15. Outwardly inclined slot 22 is formed within the ear 21 in general registry with the threaded opening 16, being adapted to loosely receive the screw or bolt 17.

Figure 6:
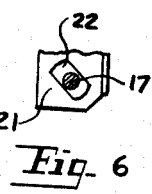
Figure 6 is a section on line 6—6 of Figure 2.

As will be seen hereinafter the elongated slot 22 shown in Fig. 6 will permit additional adjustment of the plate members 10 and 12 with respect to each other facilitating insertion of the conduit C therebetween, and also facilitate the insertion of the flanges 14 and 14a through the aperture D in the side wall A of the electrical outlet box B as shown in Fig. 1.

The ear 21 is also set off upon one side from the intermediate arcuate portion 13a by the shoulder 15a shown in Fig. 1. The opposite portion of the plate member 12 corresponding to wall portion 18 of plate member 10 also includes a straight wall portion 23 which is similarly set off upon one side defining the upper shoulder 15a as viewed in Fig. 1.

Straight wall portion 23 terminates in the angularly inturned portion 25 as shown in Fig. 2, there being a rectangular enlarged slot 26 therein adapted to loosely and cooperatively receive tongue 19 of plate member 10. The enlarged slot 26 thus permits of lateral adjusted of the plate members 10 and 12 with respect to each other, but with the upper ends thereof loosely joined as shown.

From the foregoing it will be apparent that clamp members 10 and 12 may be readily and easily assembled in conjunction with the electric conduit C so as to securely anchor the same to said clamp members and with the latter in rigid immovable relation to wall A of the terminal box or the like B having the usual aperture D to receive therethrough conduit C and the interconnected oppositely extending flanges 14 and 14a of plate members 10 and 12.

It will be understood that the terminal box B houses and protects any desired electrical outlet or source of current (not shown) to which the ends of the wires of said conduit are communicably connected as by the usual binding posts, and the opposite exterior portion of the conduit may lead to any desired switch controlled electrical fixture where the current to be utilized may be energized at the will of the user.

Figure 4:
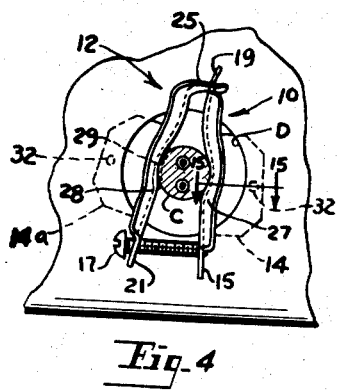
Figure 4 is a front elevational view of the clamp shown in Figure 1 but with the screw untightened, and with the cable or conduit shown in section.

The front upright edges of plate members 10 and 12 are turned outwardly to form the shoulders 27 and 28 Fig. 4, which not only reinforce said members, but also provide a throated opening between said members to facilitate insertion of the conduit therebetween.

The central concave portion 13a of plate member 12 has an outwardly projecting portion 29 formed therein for registry with the outer surface of conduit C. There is formed within the opposing intermediate member 13 of plate member 10 an angularly inturned grip or projection 30 which is pointed at 31, and which is adapted for slight retaining penetration into the outer wall of conduit C, for cooperation with the projection 29. Furthermore, projection 30 is off-set laterally with respect to projection 29 to more effectively in cooperation therewith secure said conduit between the arcuate portions of plate members 10 and 12.

The flanges 14 and 14a have formed upon their inner surfaces the inwardly extending legs or fulcrums 32 which are adapted for registry with the inner surface of the wall A of the box B adjacent its aperture D, such as is shown in Figs. 1, 4 and 15. The fulcrums 32 provide a means of slightly spacing portions of the flange 14 and 14a from the interior surface of the outlet box wall A.

This means that in the preferred embodiment of the present invention said flanges will be arranged at right angles to the bodies of the plate members 10 and 12 and the fulcrums 32 will be in cooperative engagement with the inner surface of wall A.

In assembling the parts upon outlet box B through the aperture D, the tongue 19 of clamping plate 10 is loosely inserted into the corresponding slot 26 of plate member 12. With members 10 and 12 and their corresponding concave portions 13 and 13a disposed in loose engagement with opposite sides of the conduit C on the exterior of said box, the oppositely extending flanges 14 and 14a are inserted through the box aperture D.

The slot 22 of plate member 12 is brought into opposed registry with the threaded opening 16 of plate member 10 and the screw or bolt 17 is loosely inserted through slot 22 and into the threaded opening 16 for holding engagement with plate 10. Continued rotation of the screw or bolt 17 will draw the opposed ears 15 and 21 towards each other until the respective intermediate curved portions 13 and 13a fulcrum outwardly upon the conduit in tight clamping engagement therewith, which is effectively obtained as soon as the tongue 19 bears against the wall of the slot 26 in tight immovable relation.

The corresponding shoulders 15a at the inner sides of the engaged clamping members 10 and 12 are of sufficient length to afford clearance with a minimum of tolerance for the box wall A so as to immovably fit in fixed relation between flanges 14 and 14a and the adjacent edges of the opposed wall portions 18 and 23 and the ears 15 and 21 as illustrated in Fig. 1 of the drawing.

When the screw 17 is effectively tightened, the projections 29 and 30 formed upon the inner surfaces of arcuate members 13 and 13a tightly grip the outer opposing walls of the conduit C to more effectively grip said conduit than would be done with said projections omitted.

Thus any strains imparted upon the conduit C are transmitted through the plate members 10 and 12 and the flanges 14 and 14a thereof and the wall A of the box B, thereby relieving the inner portion of the conduit from such strains which might otherwise tend to loosen or disrupt its connection with the enclosed electrical binding posts.

By employing the legs or fulcrums 32 in the flanges 14 and 14a, it is apparent that said flanges will be positioned substantially parallel to the inner surface of the box wall A. Thus when the screw 17 is tightened, the clamping members 10 and 12 are locked against the box walls with the intermediate portions 13 and 13a tightly engaging the conduit.

Figure 7:
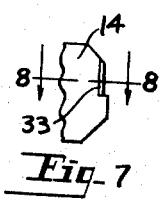
Figure 7 is a fragmentary elevational view of a variation in the formation of the clamp flanges.
Figure 8:
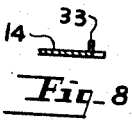
Figure 8 is a section on line 8—8 of Figure 7.

Figs. 7 and 8 illustrate a variation in the formation of the fulcrums in the flanges 14 and 14a, in that the same are formed as inturned portions 33 at the outer ends of said flanges.

Figure 9:
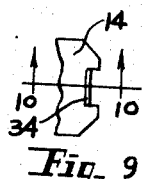
Figure 9 is similar to Figure 7, but a slight variation.
Figure 10:
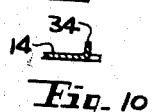
Figure 10 is a section on line 10—10 of Figure 9.

In Figs. 9 and 10 another variation is shown wherein a central portion at the outer ends of the said flanges is cut and turned inwardly defining the fulcrums 34.

Figure 11:
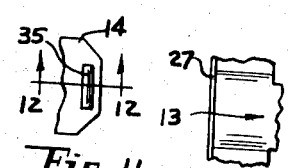
Figure 11 is similar to Figure 7, but showing a variation thereof.
Figure 5:
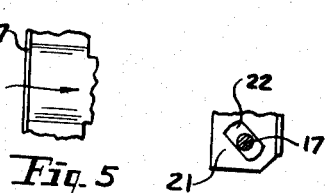
Figure 5 is a section on line 5—5 of Figure 2.
Figure 12:
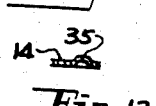
Figure 12 is a section on line 12—12 of Figure 11.
Figure 13:
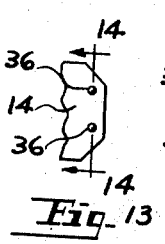
Figure 13 is similar to Figure 7 but showing another variation thereof.
Figure 14:
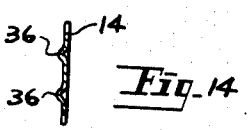
Figure 14 is a section on line 14—14 of Figure 13.

In Figs. 11 and 12 the fulcrums are formed by the inwardly depressed portions 35; whereas, in Figs. 13 and 14 the fulcrums are provided by a pair of spaced inwardly depressed circular portions 36.

Figure 3:
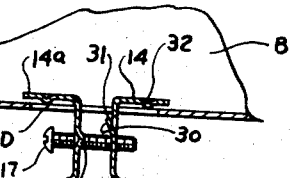
Figure 3 is a section on line 3—3 of Figure 2.

The variations in the formation of the fulcrums for the flanges 14 and 14a as shown in Figs. 7 through 14, are merely illustrative of various methods by which the same may be constructed all for the same purpose as the fulcrums 32 which are shown in Figs. 3 and 15, and which are adapted for cooperative compressive engagement with the inner wall A of the box B adjacent its aperture D through which conduit C extends.

By providing the inclined slot 22 in the ear 21 of plate 12 it is apparent that there may be some relative adjustment of plate members 10 and 12 with respect to each other without further loosening of the screw 17 or its removal, such as illustrated by the dotted lines in Fig. 4. Furthermore, a greater degree of relative adjustment is provided between the members 10 and 12 by virtue of the enlarged slot 26 at the upper end of plate member 12.

Having described my invention, reference

I claim:

Means for clamping an electrical conduit to an outlet box having a conduit receiving aperture therein, comprising a pair of separable complementary plate members each having an intermediate conduit engaging portion terminating at one end in an outwardly extending flange arranged normally thereof for positioning adjacent the interior of the box wall adjacent said aperture, fulcrum means projecting inwardly from said flanges for engaging the interior of said box wall, an ear extending from one side of each of said intermediate portions and a wall extending from the opposite sides thereof, corresponding aligned edges of said ear and wall being spaced inwardly from said flange to engage against the exterior of said box wall adjacent said aperture, said walls of the respective members having tongue and slot engaging means, there being a threaded opening and an enlarged inclined slot respectively formed in the adjacent pair of ears, a threaded fastening member loosely projected through said slot and through said threaded opening to draw said members together to clamp the conduit therebetween with their fulcrum means engaging the inner box wall surface, said fastening member being adapted for transverse movement within said slot, and opposed longitudinally offset conduit gripping elements projecting inwardly from the inner surfaces of said conduit engaging portions, the opposed outer edges of said plate members being outturned to form a throated portion to facilitate the insertion of said conduit therebetween.

SAMUEL D. J. DUNLAP.

References Cited in the file of this patent

UNITED STATES PATENTS

| Number | Name | Date |
|---|---|---|
| 1,873,895 | Kimbell | Aug. 23, 1932 |
| 1,919,940 | Hall | July 25, 1933 |
| 2,175,097 | Thomas | Oct. 3, 1939 |
| 2,487,912 | Wellman | Nov. 15, 1949 |
| 2,468,854 | Woodring | May 3, 1949 |
| 2,469,938 | Tarnow | May 10, 1949 |